(12) United States Patent
Schwulst

(10) Patent No.: US 7,775,136 B2
(45) Date of Patent: Aug. 17, 2010

(54) TWIST-GRIP HANDLEBAR CONTROLLER

(76) Inventor: Kyle E. E. Schwulst, 6833 Strawberry Lake Rd., Whitmore Lake, MI (US) 48189

(*) Notice: Subject to any disclaimer, the term of this patent is extended or adjusted under 35 U.S.C. 154(b) by 176 days.

(21) Appl. No.: 11/837,857

(22) Filed: Aug. 13, 2007

(65) Prior Publication Data
US 2009/0044653 A1    Feb. 19, 2009

(51) Int. Cl.
*G05G 13/00*    (2006.01)
(52) U.S. Cl. .................. 74/488; 188/24.22; 74/489; 477/199; 477/206
(58) Field of Classification Search .............. 188/24.22, 188/2 D; 74/488, 489; 477/168, 199, 205, 477/206; 192/85 C
See application file for complete search history.

(56) References Cited

U.S. PATENT DOCUMENTS

| | | | |
|---|---|---|---|
| 1,114,440 A * | 10/1914 | Brix | ............... 74/488 |
| 1,114,441 A * | 10/1914 | Brix | ............... 74/488 |
| 5,437,206 A | 8/1995 | Boor | |
| 5,572,907 A * | 11/1996 | Kaakinen | ............... 74/489 |
| 6,945,349 B2 | 9/2005 | Colling et al. | |
| 6,978,694 B2 * | 12/2005 | Peppard | ............... 74/489 |
| 7,021,172 B1 * | 4/2006 | Perry | ............... 74/486 |
| 2002/0184961 A1 | 12/2002 | Roberts | |

FOREIGN PATENT DOCUMENTS

DE    847863    * 8/1952

* cited by examiner

*Primary Examiner*—Thomas R Hannon
*Assistant Examiner*—Terence Boes
(74) *Attorney, Agent, or Firm*—Brooks Kushman P.C.

(57) ABSTRACT

A twist-grip controller includes a cylindrical housing adapted to be nonrotatably received within a tubular end of a handlebar, and an elongate support member having a cylindrical internal cavity and a longitudinal guide surface, the support member being supported within the housing for relative rotation about a longitudinal axis. The controller is adaptable to actuate a first cam portion axially constrained within the support member cavity, the first cam portion thereby actuating a vehicle control via fluid power through a first range of motion. Rotating the tubular sleeve through a second range actuates a second follower mounted to a second cam portion axially toward the distal end of the handlebar, thereby generating an output throttle signal.

19 Claims, 8 Drawing Sheets

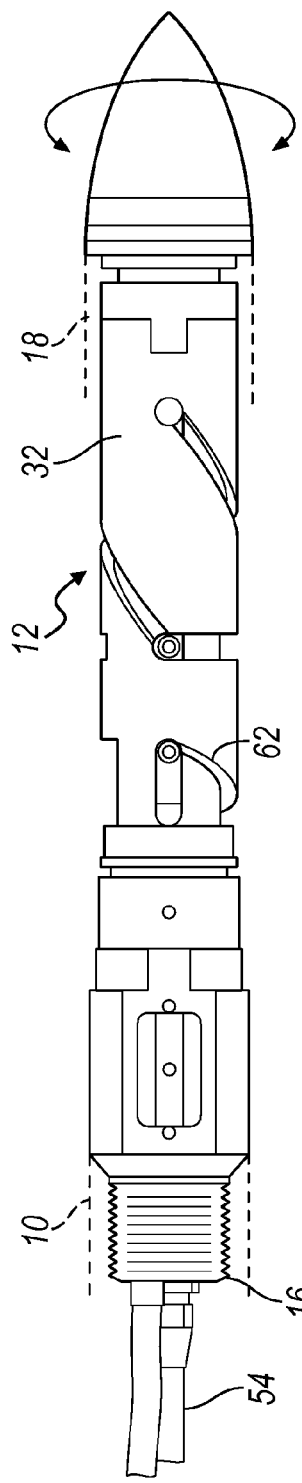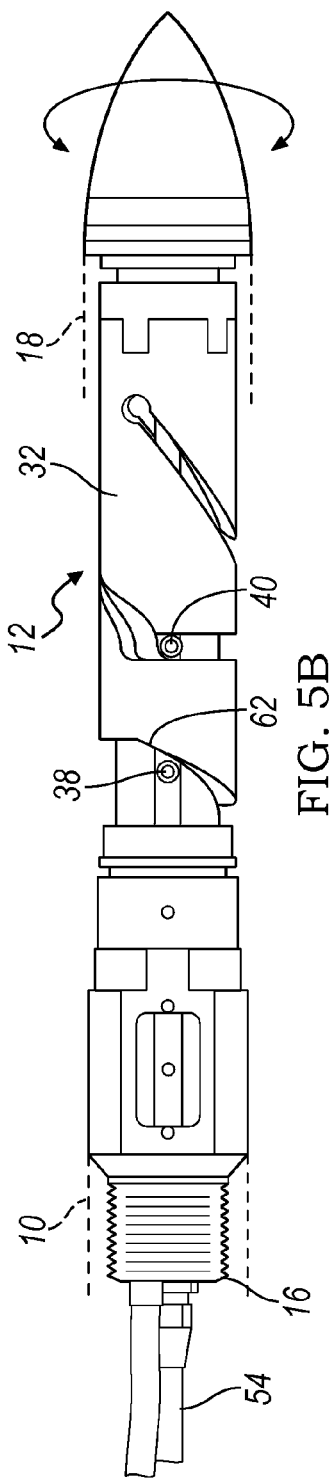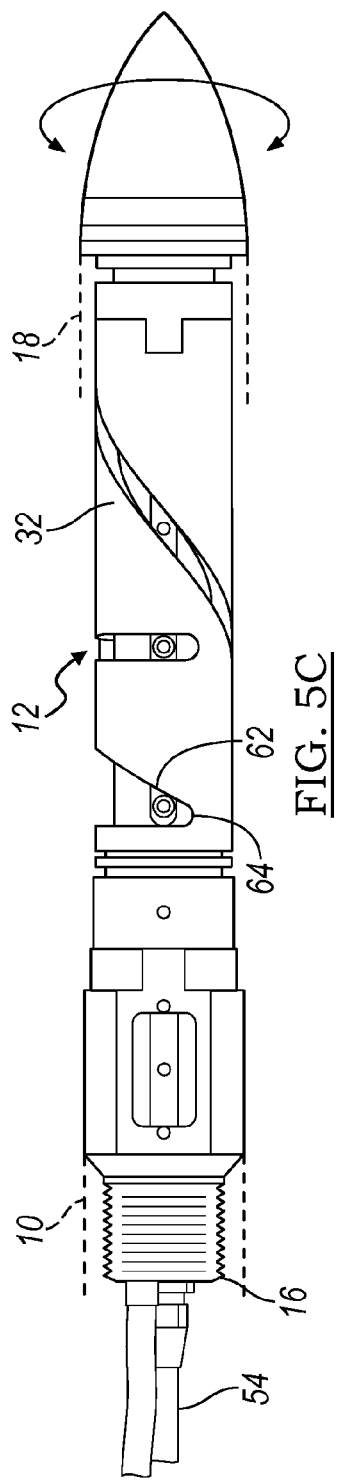

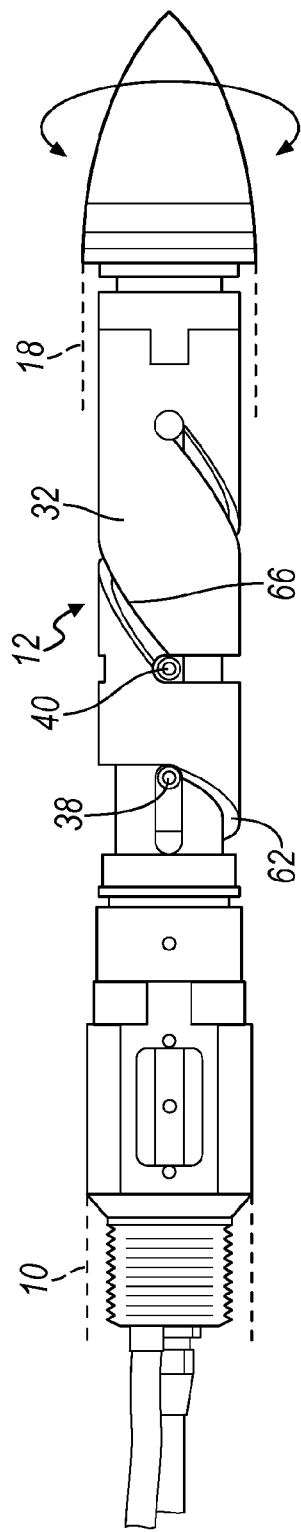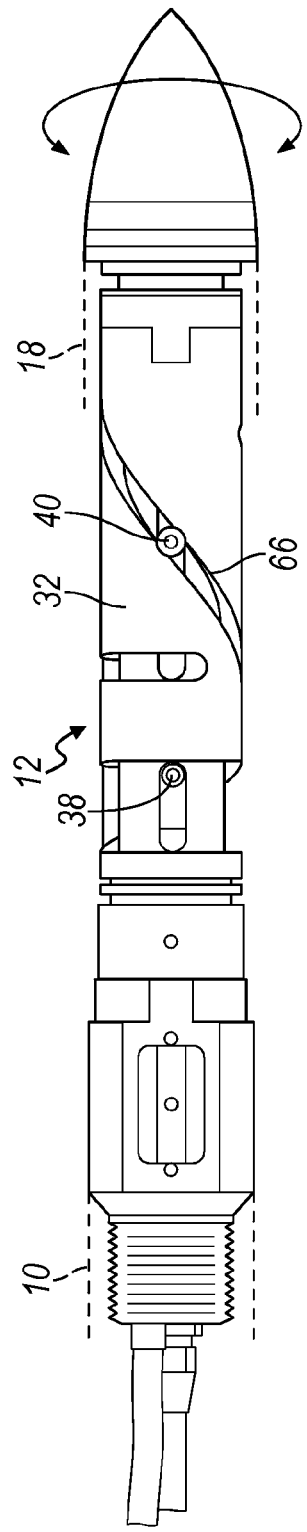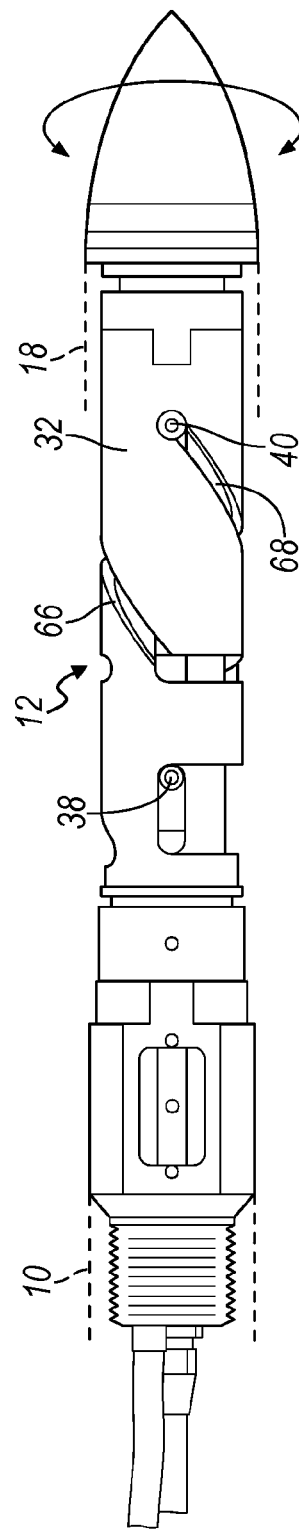

TWIST-GRIP HANDLEBAR CONTROLLER

BACKGROUND OF THE INVENTION

1. Field of the Invention

The invention relates to handlebar-mounted controller assemblies, and more particularly twist-grip handlebar controller assemblies.

2. Background of the Invention

Conventional handlebars typically have a number of cables, wires, and, in some cases, hydraulic lines to connect hand-actuated controls to their respective actuators. For example, many motorcycle handlebars have a hand lever mounted on the left side for actuating a clutch assembly and another hand lever mounted on the right side to actuate the front brake. With certain motorcycles, a clean and sleek look is desired and such cables, wires, hydraulic lines, and hand levers can by themselves give the handlebar a cluttered appearance. Also, the wires, cables, and lines for the handlebar-mounted controls are exposed to the ambient environment and thus susceptible to wear and damage. Over time, these cables and lines become dirty or worn and can further detract from the general appearance of the motorcycle.

Furthermore, the operation of a motorcycle entails the coordination of several control mechanisms. For example, a motorcycle operator must coordinate several actions, including a foot pedal mechanism for the rear brake, conventionally on the right side, and a separate right-handed twist-grip mechanism for the throttle. Furthermore, to change gears in some motorcycles, an operator must coordinate actions with their left hand, which operates the clutch and their left foot, which operates the shifter. A driver who needs to react quickly in a driving situation, particularly a novice driver, can be disadvantaged by such a complex assembly of controls.

Accordingly, what is needed is a controller that provides a convenient mechanism for the operator and enhances the driveability and aesthetic value of a motorcycle or similar vehicle, such as a straddle type, handlebar-controlled three or four wheel all-terrain vehicle.

SUMMARY OF THE INVENTION

A twist-grip controller of the present invention can be used on a motorcycle or ATV in connection with a brake assembly and a throttle assembly. The twist-grip controller includes a generally cylindrical housing that is adapted to be nonrotatably received within a generally tubular end of a handlebar, and an elongate support member having a generally cylindrical internal cavity and a longitudinal guide surface, the support member being supported within the housing for relative rotation about a longitudinal axis. A cam and a piston mechanically linked thereto are oriented within the internal cavity of the support member, the cam having a first portion and a second portion adjoined together and moving independently of one another. The piston is adjacent to a fluid cavity which transmits liquid between the twist-grip controller and an external assembly, for example a brake assembly. Rotating the tubular sleeve through a first range actuates a follower mounted on the first portion of the cam axially away from the distal end of the handlebar, moving the piston axially into the fluid cavity and actuating the respective brake mechanism or clutch assembly.

The twist-grip controller further includes a throttle cable that traverses the interior cavity of the elongate support member and mechanically fastens to the second portion of the cam. Rotating the tubular sleeve through a second range actuates a second follower mounted on the second portion of the cam axially toward the distal end of the handlebar, thereby moving the throttle cable toward the distal end of the handlebar and actuating a throttle assembly, a clutch assembly, or the like.

Other advantages, features, and benefits of the invention will be readily apparent from the following detailed description of a preferred embodiment, when taken in connection with the accompanying Drawings.

BRIEF DESCRIPTION OF THE DRAWINGS

FIGS. 5A-5C show side elevation views of the handlebar of FIG. 1, wherein the twist-grip controller is rotated through a clockwise range of motion;

FIG. 6A-6C show side elevation views of the handlebar of FIG. 1, wherein the twist-grip controller is rotated through a counter-clockwise range of motion.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
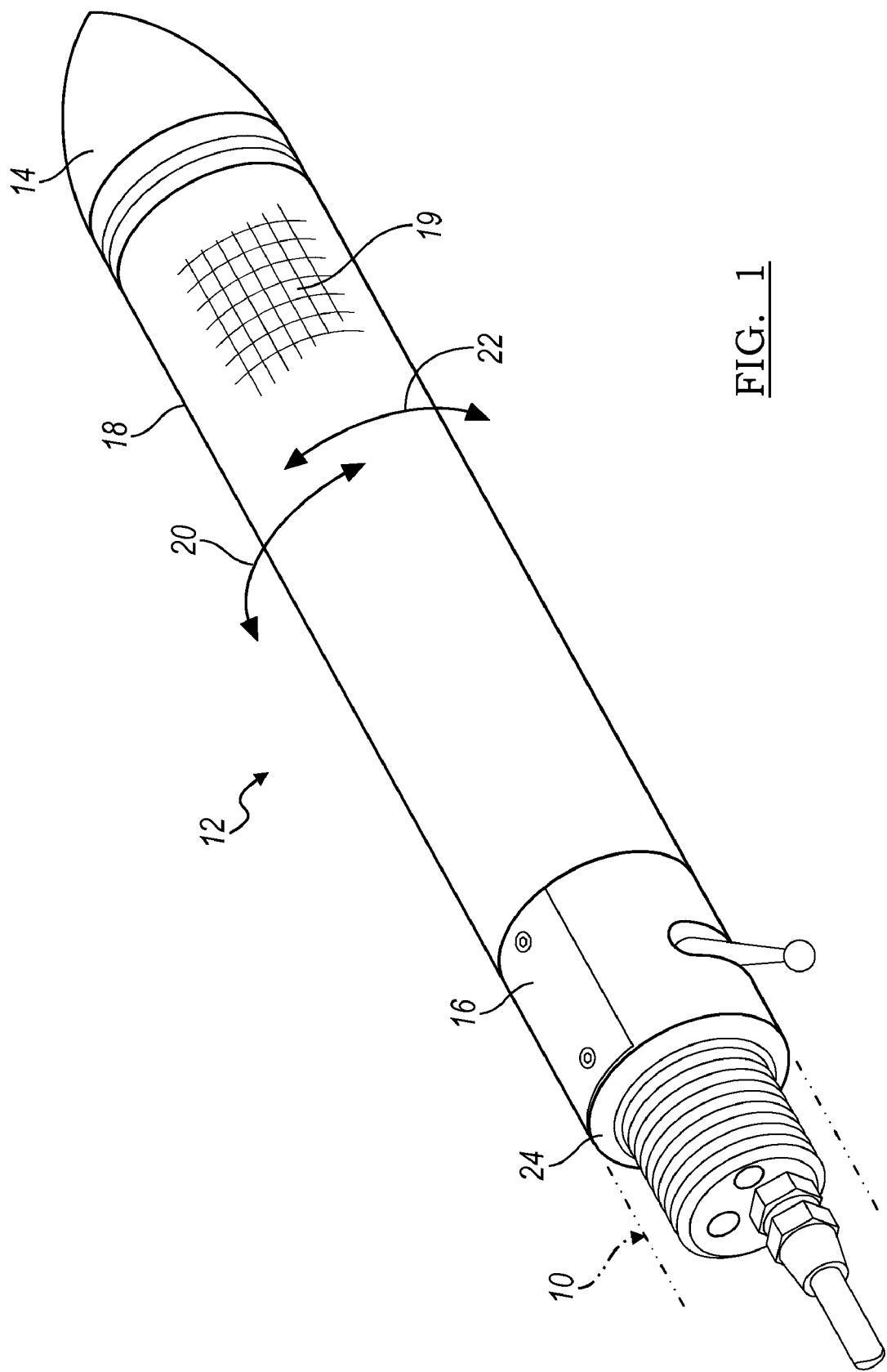
FIG. 1 shows a perspective view of a handlebar fitted with a twist-grip controller in accordance with an embodiment of the present invention.

Referring to FIG. 1, a handlebar 10 is shown fitted with an embodiment of the twist-grip controller in accordance with the present invention. The twist-grip controller assembly 12, as shown, is interposed between a distal end 14 and a near end 16 of the handlebar 10, such that an operator can rotate the outer cushion 18 of the controller assembly 12 about a central axis of the handlebar 10 through a first range 20 or second range of motion 22.

Figure 2:
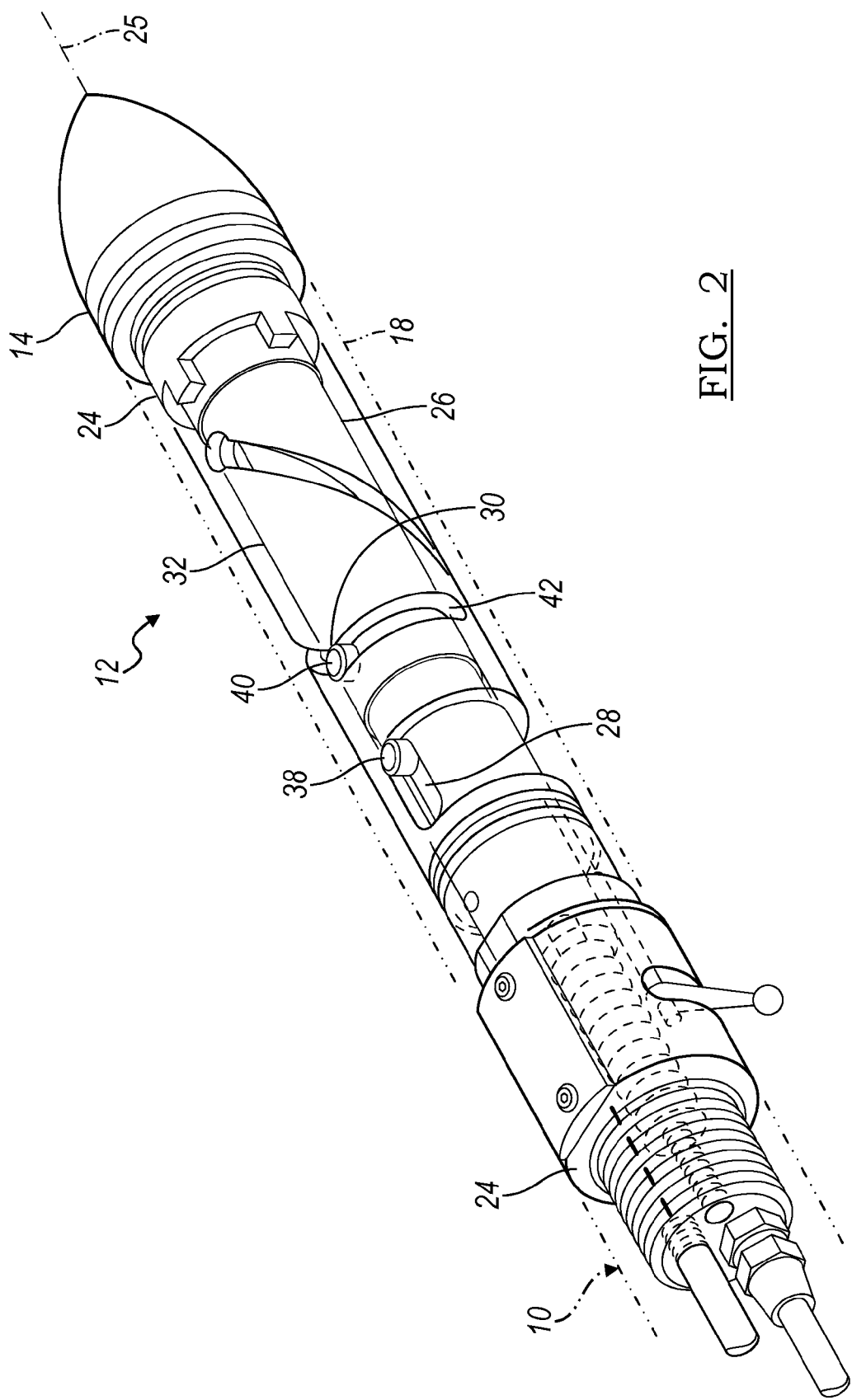
FIG. 2 shows a perspective view of a handlebar fitted with a twist-grip controller without the outer cushion.

With reference to FIGS. 1 and 2, the controller assembly 12 includes a generally cylindrical housing 24 adapted to be nonrotatably received within the distal end 14 of the handlebar 10. The housing 24 may be secured to the handlebar 10 by a threaded joint or by another suitable manner, as one skilled in the art will recognize. An elongate support member 26 having two longitudinal guide slots, 28 and 30 respectively, and a cylindrical internal cavity is affixed to or integrally formed with housing 24. Support member 26 is mechanically coupled to rotary tubular sleeve 32 which is journaled about the handlebar 10. One skilled in the art will recognize that any suitable means may be used to provide for the relative rotation, for example a ball bearing or a bushing. The tubular sleeve 32 can be coupled to an outer sleeve, for example the outer cushion of sleeve 18 shown in FIG. 1, such that the motorcycle operator may conveniently impart a desired relative rotation of the tubular sleeve 32 within the housing 24 by rotating the cushion of sleeve 18 relative to the handlebar 10. Cushioned sleeve 18 preferably is provided with a cushioned easy to grip polymeric surface having a more rigid texture sleeve, as shown by element 19 of FIG. 1, of plastic or metal could be used to practice the invention.

Figure 3:
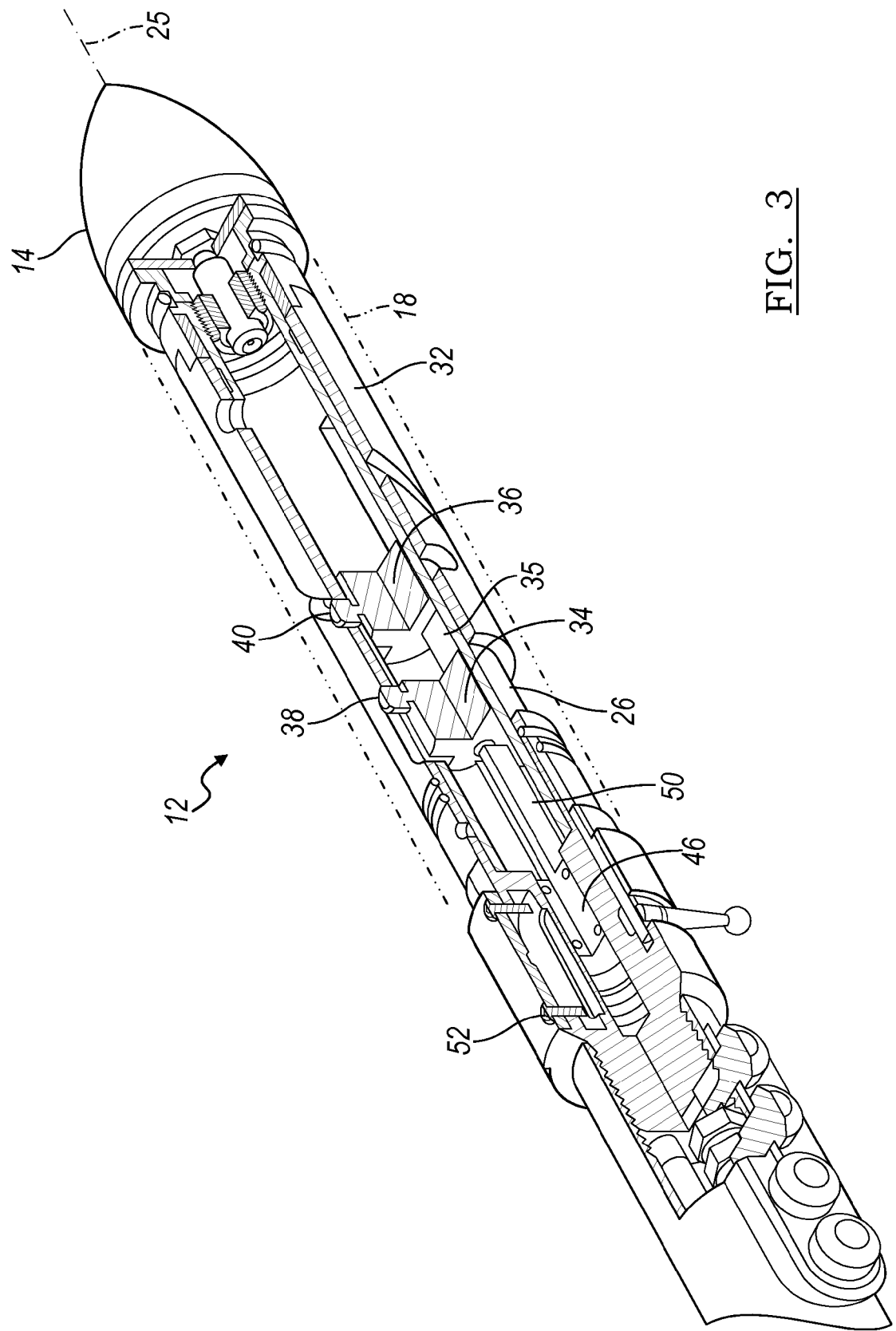
FIG. 3 shows a partial cutaway perspective view of the handlebar of FIG. 1.

Referring to FIGS. 2 and 3, the twist-grip controller assembly 12 includes a cam and follower arrangement having a first cam portion 34 and a second cam portion 36 oriented axially along the longitudinal axis 25 of the handlebar 10. The portions 34,36 are arranged such that they move independently of one another. Both portions 34,36 are constrained by the geometry of the internal cavity of the elongate support member 26 and thereby limited to moving axially along the longitudinal axis 25. Follower 38 is mounted to the first cam portion 34, extends outward therefrom and through longitudinal guide slot 28. Follower 40 is similarly mounted to the second cam portion 36 and extends radially outward through longitudinal guide slot 30, mounting adjacent to slot 42 defined by rotary sleeve 32. Although separate guide surfaces are shown to accommodate the followers 38,40, one skilled in the art will recognize that support member 26 can easily be adapted to accommodate both followers 38,40 via a single guide slot.

Figure 4A:
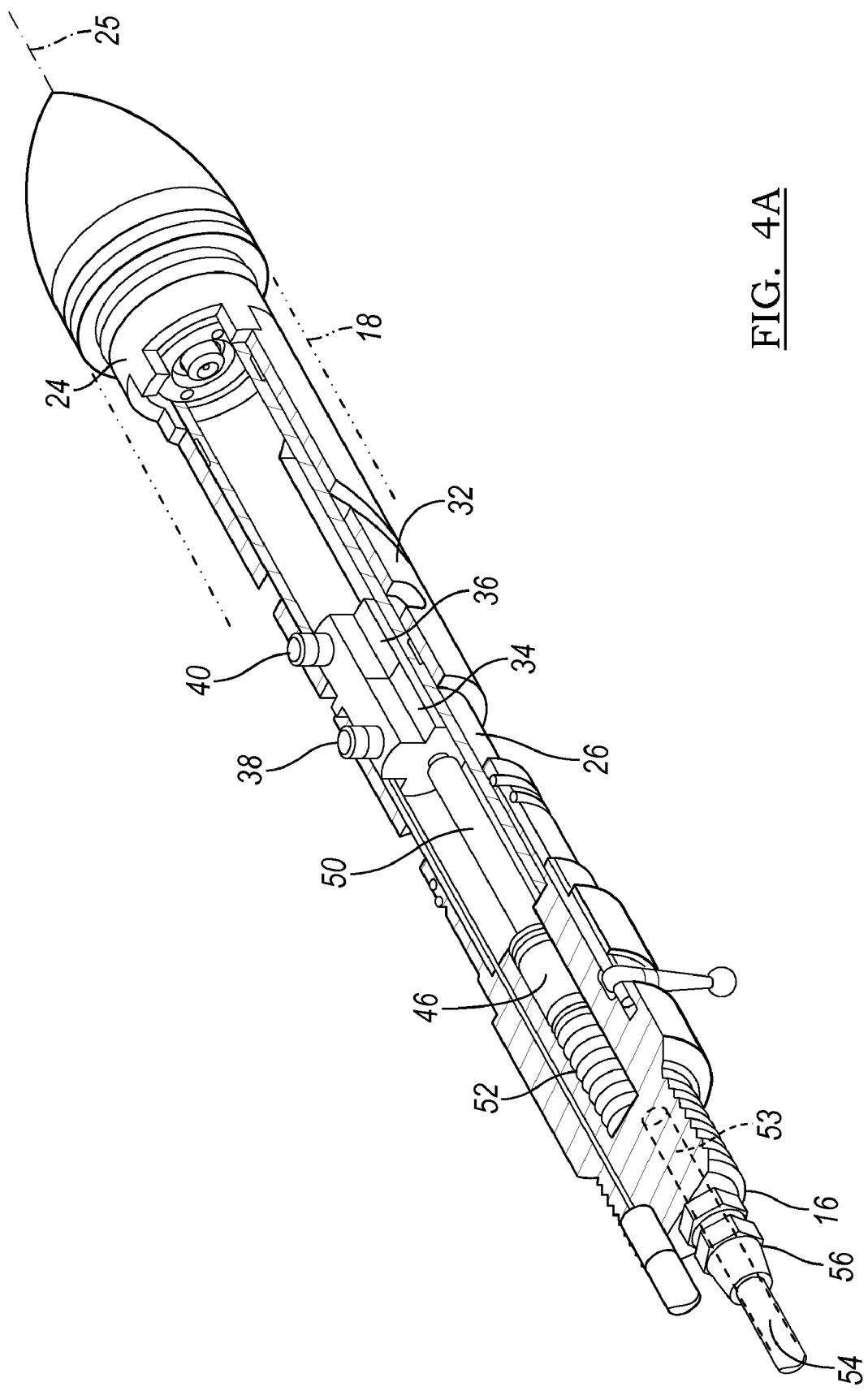
FIG. 4A and 4B show perspective views of the handlebar of FIG. 1, wherein the twist-grip controller assembly is shown in part.

Referring to FIGS. 3 and 4A, the first cam portion 34 is mechanically coupled to piston 46 via link 50, wherein the piston 46 and the link 50 are both oriented axially within the cylindrical internal cavity of the support member 26 along the longitudinal axis 25. Spring 52 cooperates in biasing the cam portion 34 and the piston 46 mechanically linked thereto at an equilibrium position. The piston 46 cooperates with a generally cylindrically shaped cavity in the housing 24 to define a variable displacement enclosed volume having a fluid contained therewithin. The cylindrical cavity is oriented along the longitudinal axis 25 adjacent to piston 46 and in fluid communication with fluid line 54.

Still referring to FIGS. 3 and 4A, the fluid line 54 is fastened to the inner end 16 of the housing 24 via a nut 56, although, as one skilled in the art will recognize, any suitable fastening method can be used, such as a tubular threaded coupling as illustrated. The fluid line 54 transmits a fluid between the twist-grip controller 12 and a motor vehicle control (not shown), for example a brake assembly. As will be apparent from the following disclosure, rotating the sleeve 32 of the controller assembly 12 in a clockwise motion can actuate the follower 38 longitudinally towards the near end 16 of the handlebar 10. The axial length of longitudinal guide slot 28 limits the extent to which the follower 38 can travel. Furthermore, a hard stop 35 may be interposed between the first cam portion 34 and the second cam portion 36 within the cavity in the housing 24 to preclude the first cam portion 34 from traveling axially toward the distal end of the handlebar 10.

Figure 4B:
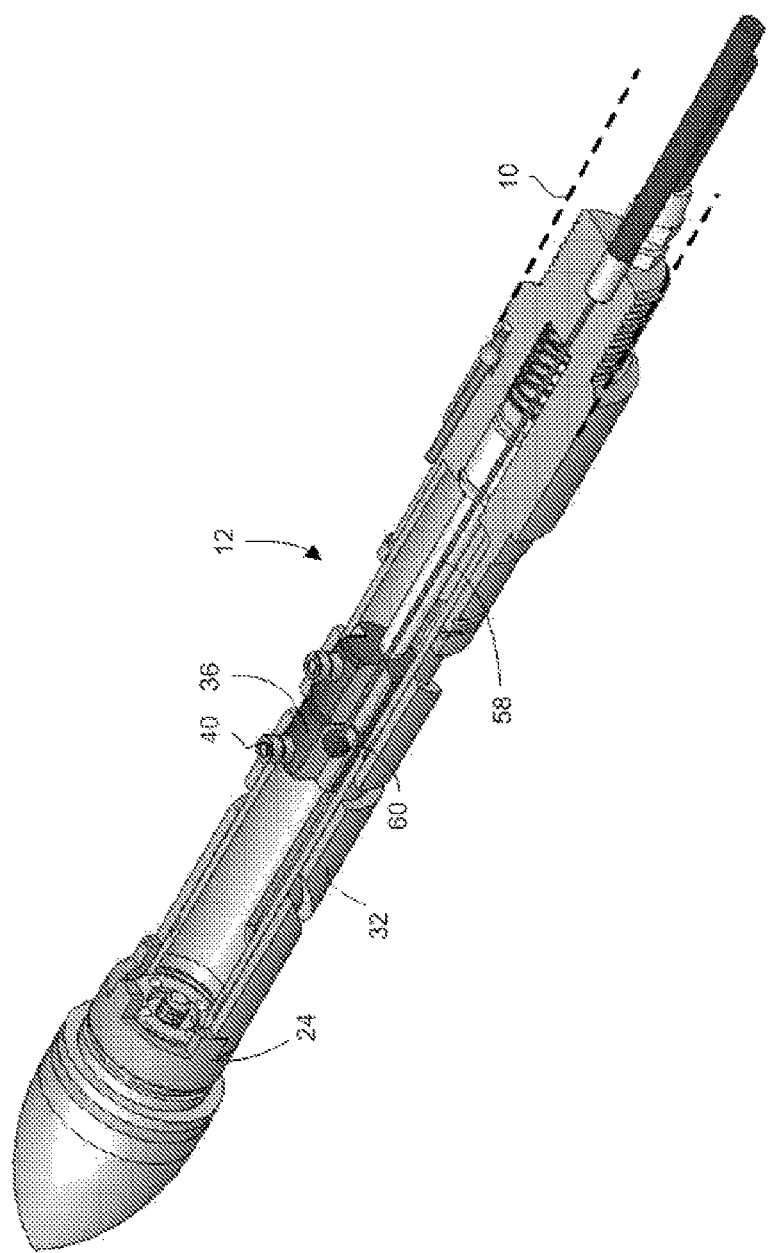

Referring to FIGS. 3 and 4B, a throttle cable 58 traverses the interior cavity of the housing and fastens to element 60 mounted to second cam portion 36. The cable may alternatively fasten to any portion of second cam portion 36 in any suitable manner. The cable may have a sufficient tension to allow the cable to retract the second cam portion 36 to a neutral position, for example upon an operator releasing the rotary tubular sleeve 32 from a counter-clockwise position. As one skilled in the art will recognize, any other suitable biasing element, such as a spring, may be used to allow the second cam portion 36 to return to a neutral position. The cable 58 may actuate a mechanical assembly (not shown), such as a throttle body, or the cable 58 may actuate an electromechanical transducer (not shown), for example a drive-by-wire system throttle input signal. As will be apparent from the following disclosure, rotating the sleeve 32 of the controller assembly 12 in a counter-clockwise motion can move the follower 40 axially toward the distal end 14 of the handlebar 10.

FIGS. 5A-5C collectively show an embodiment of the twist-grip controller assembly 12 fitted to a housing 24 about which the controller sleeve 32 rotates through a clockwise motion. The controller 12 may be in fluid communication with an external assembly via the fluid line 54 as previously described. The external assembly can be any hydraulically-actuated assembly, for example a brake assembly, a clutch assembly, or the like. In FIG. 5A, controller 12 is initially at an equilibrium position in which followers 38 and 40 are biased at a predetermined axial location. With reference to FIG. 5B, a motorcycle operator may initially rotate the tubular sleeve 32 of the handlebar 10 through a small clockwise range of motion, actuating follower 38 axially toward the near end 16 of the handlebar via the first cam inclined drive surface 62. Briefly diverting to FIG. 4A, such motion by follower 38 moves piston 46 within the fluid cavity axially toward the near end 16 of the handlebar 10, thereby displacing fluid therewithin. If, for example, the controller 12 is in fluid communication with a brake assembly, said displacement of fluid can actuate a portion of the brake assembly, for example a master cylinder, allowing an operator to impart brake pressure by rotating the sleeve 32 of the controller assembly 12. Similarly, an operator may impart a gear ratio shift in a hydraulic clutch assembly by rotating the sleeve 32 as mentioned.

Referring to FIG. 5C, the controller sleeve 12 is shown to be further rotated from FIG. 5B. Note that an end 64 of the cam surface 62 limits the maximum clockwise rotation of controller sleeve 32. This end of travel may, for example, dictate the maximum braking pressure with respect to a brake assembly or, alternatively, a shift to a maximum (or minimum) gear ratio in a hydraulic clutch assembly. Note that, in each of FIGS. 5A-5C, follower 40, along with the second cam portion 36 attached thereto, is axially constrained throughout the range of rotation, while follower 38, along with the first cam portion 34 attached thereto, is increasingly displaced axially toward the near end 16 of the handlebar 10. In this manner, one cam portion can move independently of the other.

FIGS. 6A-6C together show an embodiment of the twist-grip controller assembly 12 fitted to a handlebar 10, in which the controller sleeve 32 is rotated through a counter-clockwise motion, thereby generating a throttle output signal. As previously shown in FIG. 4B, throttle cable 58 is mechanically joined to element 60 mounted to second cam portion 36. The throttle cable can be configured such that axial movement of the cable toward the distal end 14 of the handlebar 10 generates a throttle output signal. A number of other configurations could also be used to generate a throttle output signal with respect to the controller assembly 12. For example, a hall effect sensor (not shown) could be mounted in the assembly 12 to provide an output signal in response to axial movement of second cam portion 36, provided that second cam portion 36 is of a suitable material for interfacing with said sensor.

Referring now to FIG. 6A, the controller 12 and rotary sleeve 32 are initially at an equilibrium position in which followers 38 and 40 are biased at some predetermined axial location. With reference to FIG. 6B, a motorcycle operator may rotate the tubular rotary sleeve 32 of the controller assembly 12 through a counter-clockwise range of motion, actuating follower 40 axially toward the distal end 14 of the handlebar via the cam slot upper portion 66. Briefly diverting to FIG. 4B, such motion by follower 40 actuates throttle cable 58 axially toward the distal end 14 of the handlebar 10, thereby generating a throttle output signal.

Referring to FIG. 6C, the rotary sleeve 32 is shown to be further rotated from FIG. 6B. Note that a cam slot end 68 limits the maximum counter-clockwise rotation of rotary sleeve 32. This end of travel may, for example, dictate the maximum throttle output with respect to a throttle assembly. Note that in each of FIGS. 6A-6C, follower 38, along with the first cam portion attached thereto, is axially constrained throughout the range of rotation, while follower 40, along with the second cam portion attached thereto, is increasingly displaced axially toward the distal end 14 of the handlebar 10. In this manner, one cam portion can move independently of the other.

Figure 7:
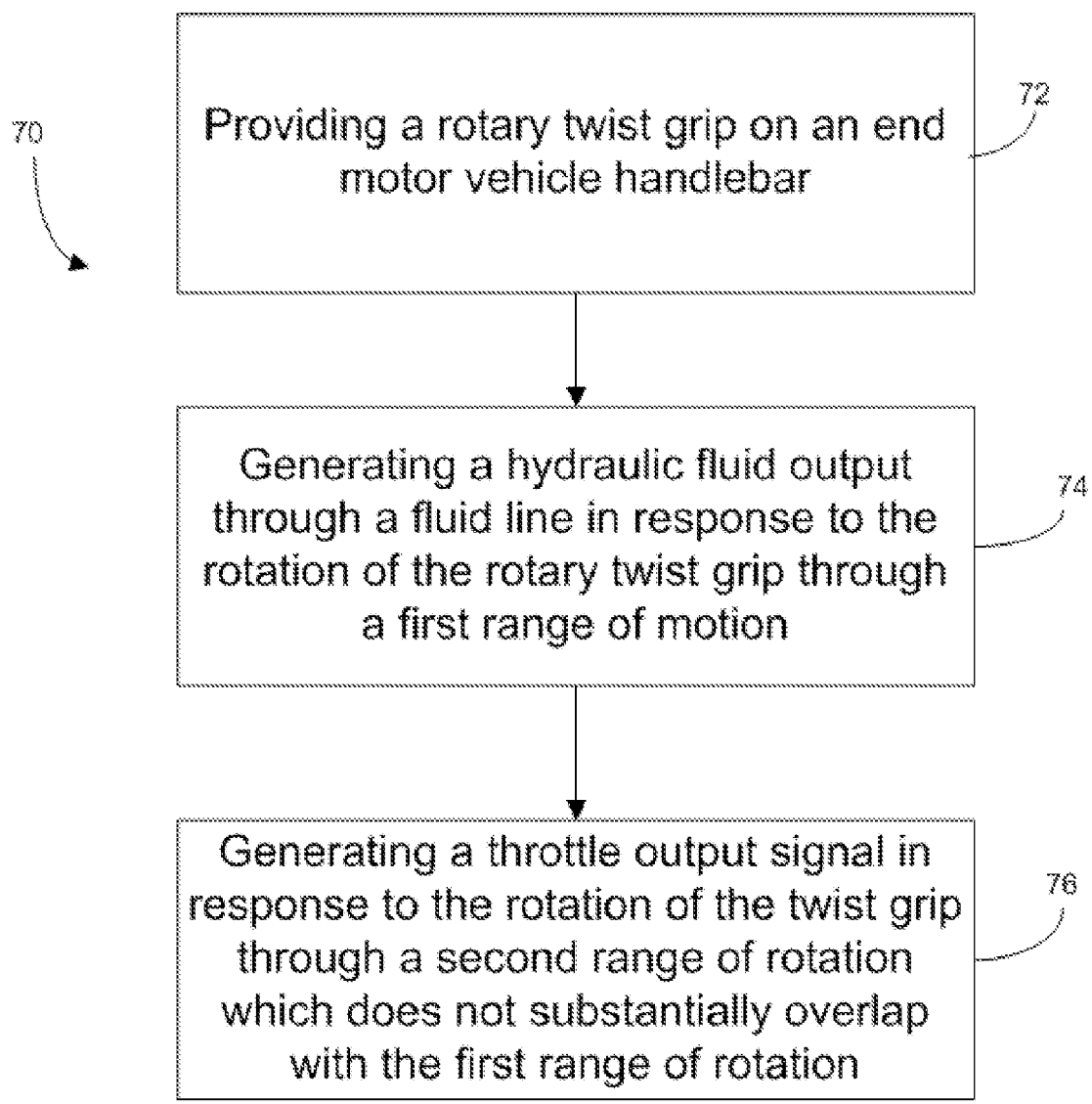
FIG. 7 shows a flow diagram illustrating a method of the twist-grip controller in accordance with embodiments of the present invention.

FIG. 7 shows a flow diagram 70 that summarily describes a method in accordance with embodiments of the invention. As shown by 72, the method includes providing a rotary twist grip on the end of a motor vehicle handlebar, as previously described and shown. the tubular sleeve can include any suitable sleeve that preferably includes an outer cushion layer to provide the operator with a comfortable grip. The method allows for generating a hydraulic fluid output through a fluid line in response to the rotation of the rotary twist grip through a first range of motion (element 74), as previously described and shown with respect to FIGS. 5A-5C.

Referring briefly to FIG. 3, a hard stop 35 may be interposed between the first cam portion 34 and the second cam portion 36 within the cavity in the housing 24 to prevent the first cam portion 34 from over-traveling past the neutral position, thereby increasing the safety of the controller 12. The spring 52 may be sufficiently loaded to bias the first cam portion 34 to a neutral position, for example when an operator releases the rotary sleeve 32. Referring now to FIG. 7, the twist-grip controller further provides for generating a throttle output signal in response to the rotation of the twist-grip controller through a second range of motion (element 76), as shown and described with respect to FIGS. 6A-6C. Embodiments of the twist-grip controller are quite adaptable and suitable for orientation in a variety of locations.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, while the twist-grip controller 10 is described in the context of a handlebar controller for a motorcycle, the twist-grip controller 10 in accordance with the invention is suitable for use wherever a handlebar-mounted rotatable control element is desired.

What is claimed is:

1. A twist grip controller, comprising:
a housing;
an elongate support member attached to the housing and having a first longitudinal guide slot and a second longitudinal guide slot;
a rotary tubular sleeve mounted about the elongate support member and defining a first cam and a second cam, the first cam having a first circumferential portion at a first axial distance transitioning into a first spiral portion and the second cam having a second circumferential portion at a second axial distance transitioning into a second spiral portion;
a first cam follower cooperating with the first longitudinal guide slot and having a first projection extending radially outward through the first cam; and
a second cam follower cooperating with the second longitudinal guide slot and having a second projection extending radially outward through the second cam.

2. The grip of claim 1 wherein:
the first circumferential portion is at a first axial distance from an end of the rotary tubular sleeve; and
the second circumferential portion is at a second axial distance from an end of the rotary tubular sleeve.

3. The grip of claim 1 wherein:
when the rotary tubular sleeve is rotated within a first rotary range, the first cam follower cooperates with the first circumferential portion and the second cam follower cooperates with the second spiral portion; and
when the rotary tubular sleeve is rotated within a second rotary range, the first cam follower cooperates with the first spiral portion and the second cam follower cooperates with the second circumferential portion.

4. The grip of claim 3 wherein the first rotary range and the second rotary range are mutually exclusive.

5. A twist grip controller for installation in an end of a generally-tubular handlebar of a motor vehicle, the twist grip controller comprising:
a housing adapted to be nonrotatably received within the end of the handlebar, the housing forming a cylindrical internal cavity aligned along a longitudinal axis and a fluid port communicating with the internal cavity;
an elongate support member, attached to the housing in a cantilevered manner and extending therefrom along the longitudinal axis, the elongate support member having a wall defining an outer support surface, an elongate internal cavity, and a first longitudinal guide slot extending there through;
a rotary tubular sleeve mounted about the elongate support member outer support surface for rotational movement through a limited range about the longitudinal axis while axially constrained, the rotary tubular sleeve having a wall defining a first cam slot extending there through in partial overlapping alignment with the first longitudinal guide slot in the elongate support member; and
a first cam follower oriented partially within the elongate support member internal cavity and projecting radially outward through the first longitudinal guide slot and the first cam slot, the first cam slot having a circumferential portion at a first axial distance with respect to an end of the rotary tubular sleeve, the first cam slot being contiguous with a spiral portion.

6. The twist grip controller of claim 5, further comprising:
a piston sealingly cooperating with the internal cavity in the housing to define a variable displacement enclosed volume, the piston driven axially in response to axial movement of the cam follower; and
a fluid line communicating with the fluid port in the housing to transmit a liquid working fluid between the variable displacement enclosed volume in the housing and one of a brake and a clutch actuated by fluid power.

7. The twist grip controller of claim 6, further comprising a spring biasing the piston to a position maximizing the size of the variable displacement enclosed volume.

8. The twist grip controller of claim 5, further comprising:
a second longitudinal guide slot extending through the elongate support member;
a second cam slot extending through the rotary tubular sleeve, the second cam slot having a circumferential portion at a second axial distance contiguous with a spiral portion wherein:
rotation of the rotary tubular sleeve through a first rotary range causes the first cam follower to move longitudinally as it rides on the spiral portion associated with the first cam and the second cam follower to remain stationary; and
rotation of the rotary tubular sleeve through a second rotary range causes the first cam follower to remain stationary and the second cam follower to move longitudinally as it rides on the spiral portion associated with the second cam.

9. The twist grip controller of claim 5, further comprising a throttle actuator cooperating with the rotary sleeve and the support member to provide a throttle output in response to the rotation of the rotary tubular sleeve through a second rotary range.

10. A twist grip controller for installation in an end of a generally-tubular handlebar of a motor vehicle, the twist grip controller comprising:
a housing adapted to be nonrotatably received within the end of the handlebar;
an elongate support member attached to the housing in a cantilevered manner and extending therefrom along the longitudinal axis, the elongate support member having a wall defining an outer support surface, an elongate internal cavity, and a first longitudinal guide slot and a second longitudinal guide slot;
a rotary tubular sleeve mounted about the elongate support member outer support surface for rotational movement through a limited range about the longitudinal axis while axially constrained, the rotary tubular sleeve defining a first cam and a second cam, the first cam having a first circumferential portion at a first fixed axial position with respect to an end of the rotary tubular sleeve transitioning into a first spiral portion, the second cam having a second circumferential portion at a second fixed axial position with respect to an end of the rotary tubular sleeve transitioning into a second spiral portion;
a first cam follower oriented partially within the elongate support member internal cavity and cooperating with the first longitudinal guide slot to prohibit rotational movement about the longitudinal axis while allowing limited axial movement, the first cam follower having a first projection extending radially outward through the first cam; and
a second cam follower oriented partially within the elongate support member internal cavity and cooperating with the second longitudinal guide slot to prohibit rotational movement about the longitudinal axis while allowing limited axial movement, the second cam follower having a second projection extending radially outward through the second cam wherein when a position of the rotary tubular sleeve is within a first rotary range, the first cam follower engages with the first circumferential portion of the first cam and the second cam follower engages with the second spiral portion of the second cam; and when a position of the rotary tubular sleeve is within a second rotary range, the first cam follower engages with the first spiral portion of the first cam and the second cam follower engages with the second circumferential portion of the second cam.

11. The twist grip controller of claim 10, wherein the housing forms a cylindrical internal cavity aligned along a longitudinal axis and defines a fluid port communicating with the internal cavity, the twist grip further comprising:
a piston sealingly cooperating with the internal cavity in the housing to define a variable displacement enclosed volume, the piston driven axially in response to axial movement of the cam follower; and
a fluid line communicating with the fluid port in the housing to transmit a liquid working fluid between the variable displacement enclosed volume in the housing and a motor vehicle control actuated by fluid power.

12. The twist grip controller of claim 11, wherein said motor vehicle control actuated by fluid power is one of a clutch and a brake.

13. The twist grip controller of claim 10, further comprising a throttle actuator cooperating with the rotary sleeve and the support member to provide a throttle output in response to the rotation of the rotary through the second rotary range.

14. A twist grip controller for installation in an end of a generally-tubular handlebar of a motor vehicle, the twist grip controller comprising:
a housing adapted to be nonrotatably received within the end of the handlebar, the housing defining a variable displacement enclosed volume and a fluid port communicating with the variable displacement enclosed volume;
a piston in the variable displacement enclosed volume;
an elongate support member attached to the housing in a cantilevered manner and extending therefrom along the longitudinal axis, the elongate support member having a wall defining an outer support surface, an elongate internal cavity, and a first longitudinal guide slot;
a rotary tubular sleeve mounted about the elongate support member outer support surface for rotational movement through a limited range about the longitudinal axis while axially constrained, the rotary tubular sleeve having a wall defining a first cam, the first cam having a circumferential portion contiguous with a spiral portion, the circumferential portion being at a first fixed axial distance with respect to the rotary tubular sleeve;
a first cam follower oriented partially within the elongate support member internal cavity and cooperating with the first longitudinal guide slot to prohibit rotational movement while allowing limited axial movement, the first cam follower having a projection extending radially outward through the first cam, in the rotary tubular sleeve, wherein the first cam follower cooperates with the circumferential portion of the first cam when the rotary tubular sleeve is within a first rotary range thereby causing the first cam follower to remain stationary and the first cam follower cooperates with the spiral portion of the first cam when the rotary tubular sleeve is within a second rotary range thereby causing the first cam follower to move along the longitudinal axis in response to movement of the rotary tubular sleeve within the second rotary range;

a member defining a cylindrical internal cavity, the member driven axially in response to axial movement of the first cam follower; and a fluid line communicating with the fluid port in the housing to transmit a liquid working fluid between the variable displacement enclosed volume in the housing and a motor vehicle control actuated by fluid power.

15. The twist grip controller of claim 14, wherein said motor vehicle control actuated by fluid power is a brake.

16. The twist grip controller of claim 14, wherein said motor vehicle control actuated by fluid power is a clutch.

17. The twist grip controller of claim 14, further comprising:

a second cam defined by the rotary tubular sleeve, the second cam having a circumferential portion contiguous with a spiral portion, the circumferential portion being at a second fixed axial distance with respect to the rotary tubular sleeve;

a second cam follower oriented partially within the elongate support member internal cavity and cooperating with the second longitudinal guide slot to prohibit rotational movement while allowing limited axial movement, the second cam follower having a projection extending radially outward through the second cam in the rotary tubular sleeve, wherein the second cam follower cooperates with the circumferential portion of the second cam when the rotary tubular sleeve is within the second rotary range thereby causing the second cam follower to remain stationary and the second cam follower cooperates with the spiral portion of the second cam when the rotary tubular sleeve is within the first a rotary range thereby causing the second cam follower to move along the longitudinal axis in response to movement of the rotary tubular sleeve within the first rotary range; and a throttle actuator cooperating with the second cam follower wherein rotation of the rotary tubular sleeve through the second rotary range causes the second cam follower to move along the longitudinal axis thereby providing a throttle output.

18. The twist grip controller of claim 17, wherein the throttle actuator is formed by a side member free to move through a limited axial range relative to the elongated support while constrained rotationally.

19. The twist grip controller of claim 18, wherein the throttle actuator further comprises a throttle cable having an end affixed to the side member.

* * * * *